US006746040B2

(12) United States Patent
Bordeleau et al.

(10) Patent No.: US 6,746,040 B2
(45) Date of Patent: Jun. 8, 2004

(54) RETRACTABLE AND EXPANDABLE TRAILER (75) Inventors: Yvon Bordeleau, 270 Du Moulin, St-Adelphe-de-Champlain (Québec) (CA), G0X 2G0; Cécile Marcotte, 270 Du Moulin, St-Adelphe-de-Champlain (Québec) (CA), G0X 2G0; Larry Maxwell, Ste-Foy (CA); René Brisson, St-Étienne-de-Lauzon (CA)

(73) Assignees: Yvon Bordeleau, St-Adelphe-de-Champlain (CA); Cécile Marcotte, St-Adelphe-de-Champlain (CA)

( * ) Notice: Subject to any disclaimer, the term of this patent is extended or adjusted under 35 U.S.C. 154(b) by 0 days.

(21) Appl. No.: 10/125,607

(22) Filed: Apr. 19, 2002

(65) Prior Publication Data
US 2003/0197352 A1 Oct. 23, 2003

(51) Int. Cl.⁷ ................................................ B62B 1/00
(52) U.S. Cl. ..................................... 280/656; 296/26.13
(58) Field of Search ................................ 280/656, 401; 296/172, 173, 174, 176, 26.12, 26.14, 165, 26.13

(56) References Cited

U.S. PATENT DOCUMENTS

| 2,704,223 | A | * | 3/1955 | Houdart | 296/26.13 |
|---|---|---|---|---|---|
| 2,790,673 | A | * | 4/1957 | Zur Nieden | 296/171 |
| 3,330,574 | A | * | 7/1967 | Kulyk | 280/656 |
| 3,698,734 | A | * | 10/1972 | Drake | 280/656 |
| 4,119,224 | A | * | 10/1978 | Moody | 414/537 |
| 4,221,398 | A | * | 9/1980 | Pautrat | 280/444 |
| 4,358,133 | A | * | 11/1982 | Stucky | 280/656 |
| 4,772,038 | A | * | 9/1988 | MacDonald | 280/401 |
| 5,118,245 | A | * | 6/1992 | Dunkel | 414/537 |
| 5,332,276 | A | * | 7/1994 | Blodgett, Jr. | 296/26.13 |
| D373,335 | S | * | 9/1996 | Repke | D12/101 |
| 5,902,001 | A | * | 5/1999 | Schneider | 296/26.13 |
| 2003/0184055 | A1 | * | 10/2003 | Badger et al. | 280/656 |

FOREIGN PATENT DOCUMENTS

FR  2500386  *  8/1982

* cited by examiner

Primary Examiner—Bryan Fischmann
(74) Attorney, Agent, or Firm—Ogilvy Renault; Paul Marcoux (57) ABSTRACT The trailer comprises a rectangular framework, a loading box fixedly mounted on the framework and including a horizontal platform, and a group of freely rotatable carrying wheels which allow the trailer to be pulled. The trailer is characterized in that two frames are disposed underneath the framework and are arranged to engage one frame into the other one between an expanded position of the trailer where the frames are drawn apart from one another and a retracted position where the frames are drawn in towards one another. The framework holds the frames with supports, that are arranged to permit a simultaneous transverse and longitudinal movement of the frames with respect to the framework when said frames are moved between an expanded position and a retracted position.

14 Claims, 8 Drawing Sheets

RETRACTABLE AND EXPANDABLE TRAILER

BACKGROUND OF THE INVENTION (a) Field of the Invention

The invention concerns a trailer of the type in which the width can vary depending on specific needs. More particularly, the invention is directed to a trailer that is provided with a mechanism which enables to move apart the carrying wheels, while obtaining a loading box that can be expanded in the same proportions.

(b) Description of the Prior Art

The use of trailers hitched behind a vehicle often results in problems of width, specially with respect to small trailers that one would wish to place behind a small vehicle such as an all-terrain vehicle. Under these circumstances, one must turn to trailers of different widths, alternatively resort to a trailer that can be adjusted to different widths.

Structures that permit the expansion and the retraction of a trailer are known such as those described in the following US patents:

U.S. Pat. No. 4,221,398
U.S. Pat. No. 4,772,038
U.S. Pat. No. 5,249,823
U.S. Pat. No. 5,326,128
U.S. Pat. No. 5,332,276

However, these structures are all as much complicated as one another and do not permit the construction of a retractable and expandable trailer at a reasonable cost that is also easy to operate.

SUMMARY OF THE INVENTION

It is an object of the invention to provide a trailer whose width can be modified if needed, that is not costly and is easy to adjust.

The present invention concerns a retractable and expandable trailer comprising a rectangular framework, a loading box fixed to the framework and including a horizontal freely rotatable carrying wheels enabling to pull the trailer. The latter is characterized in that there are provided two frames disposed under the framework and arranged to engaged into one another between an expanded position of the trailer where the frames are drawn apart from one another and a retracted position of the trailer where the frames are drawn nearer to one another, supports fixedly mounted on the framework, the framework holding the frames by means of the supports, the supports being arranged to permit a simultaneous transverse and longitudinal movement of the frames with respect to the framework when the frames are moved from an expanded position to a retracted position, the carrying wheels being respectively fixed to the two frames, and an articulation device permitting to move the frames by transverse and longitudinal sliding in the supports from an expanded position to a retracted position and vice versa, Longitudinal members adapted to juxtaposed the horizontal platform on both sides thereof in expanded position of the trailer.

Preferably, the trailer comprises a front panel rising from the front end of the rectangular framework, to join the vertical lateral panels and thereby constitute the loading box.

The rectangular framework preferably includes lateral sides; a rear side and a front side and a central link, fixed between the rear and front sides; the longitudinal members are each pivotally mounted along the lateral sides of the rectangular framework to adopt either a vertical position in retracted position of the trailer, where the longitudinal members and the panels abut one another; or, a horizontal position in expanded position of the trailer where the longitudinal members then constitute extension of the platform.

According to a preferred embodiment of the invention, each longitudinal member comprises a secondary panel perpendicularly fixed at one end of the longitudinal member thus constituting an extension of the front panel in expanded position of the trailer when the longitudinal member is in horizontal position; when the member is in vertical position, in the retracted position of the trailer, the secondary panel is positioned outside the front panel and against the latter, while each lateral panel rests on a corresponding longitudinal member, the latter then being in vertical position.

According to another preferred embodiment of the invention, the articulation device comprises a pivoting rod, that is articulated at one end along a leg of a frame and at the other end along a corresponding leg of the other frame, the pivoting rod being mounted on the framework, and enabling a 180° rotation of the rod causing a drawing in or drawing out of the frames between in the retracted and expanded positions, by articulation of the rotary rod with respect to the two legs on which it is articulated.

Preferably, the articulation device comprises two articulated rods, so that each leg of a frame is connected to a corresponding leg of the other frame.

According to another preferred embodiment of the invention, the trailer comprises a pivot pulley fixed to each of the articulated rods, at a location where the latter pivots on the framework, driving means provided for rotation of the two pulleys and thus causing a 180° rotation of each of the articulated rods, and consequently, drawing out or in of the two frames.

Each pivoting rod is preferably pivotally mounted on the central link of the framework.

According to another preferred embodiment of the invention, the trailer comprises a drawbar that is mounted on the framework, a transmission mounted on the drawbar, the transmission being operatively connected to each of the articulated rods, by means of the pivot pulleys.

Preferably, the trailer according to the invention comprises a support for each of the two legs of the two frames, the supports being shaped to define a rectangular opening capable of receiving one of the legs and permitting a transverse and longitudinal sliding of the legs in the supports.

According to another preferred embodiment of the invention, the transmission comprises a driving pulley as well as a crank in order to rotate the driving pulley. The pivot pulley and the driving pulley are preferably sheave wheels which are functionally connected to one another by means of a system of straps.

BRIEF DESCRIPTION OF THE DRAWINGS

The invention will be better understood with reference to a preferred embodiment given by way of example and without limitation of the scope of the invention, said preferred embodiment being illustrated by means of the annexed drawings, in which.

DESCRIPTION OF THE PREFERRED EMBODIMENT

With reference to the drawings, it will be seen that a trailer according to the invention first consists of a framework 1 that is generally rectangular, and carries two movable frames 3 and 5, on which carrying wheels 7 and 9 are mounted, by means of freely rotatable cylinders, respectively 11 and 13, held to the frames by means of suitable supports 15 and 17.

Figure 1:
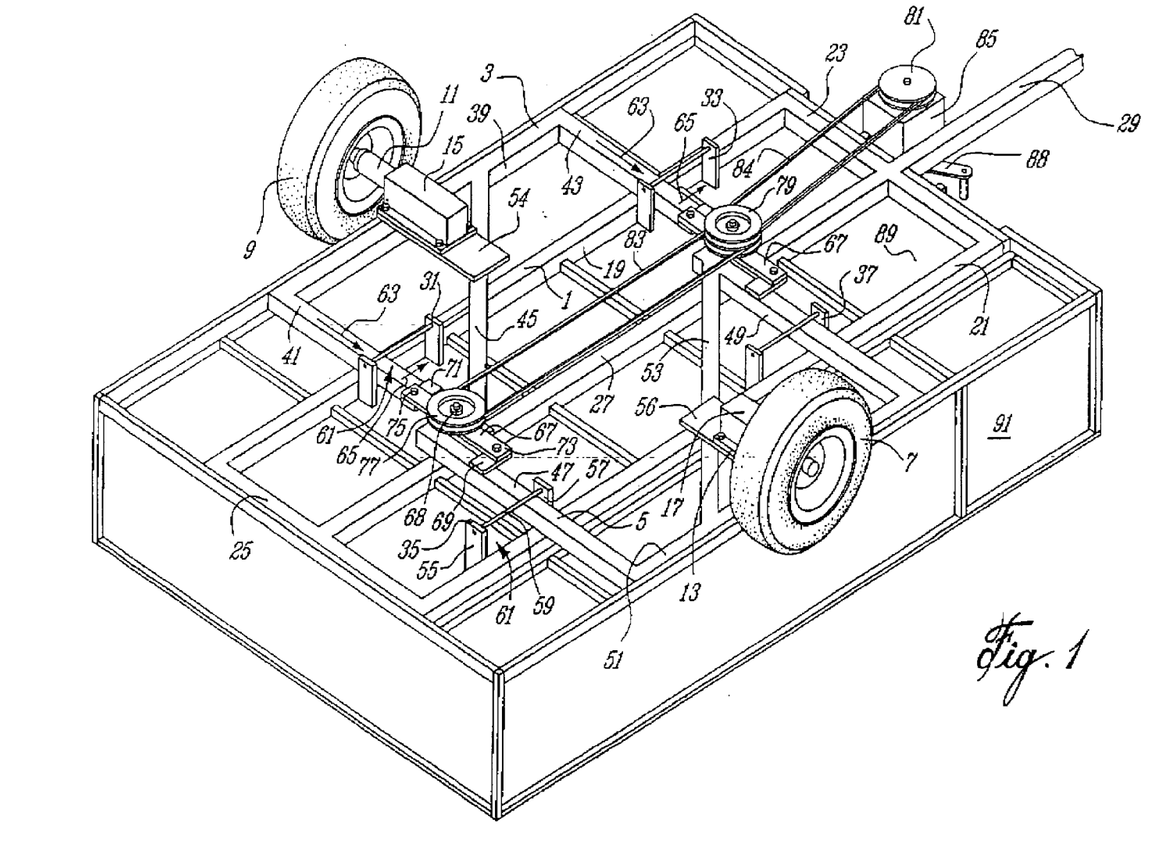
FIG. 1 is a perspective view taken from underneath a trailer according to the invention, illustrating the mechanism that permits the expansion and the retraction of the trailer.
Figure 2:
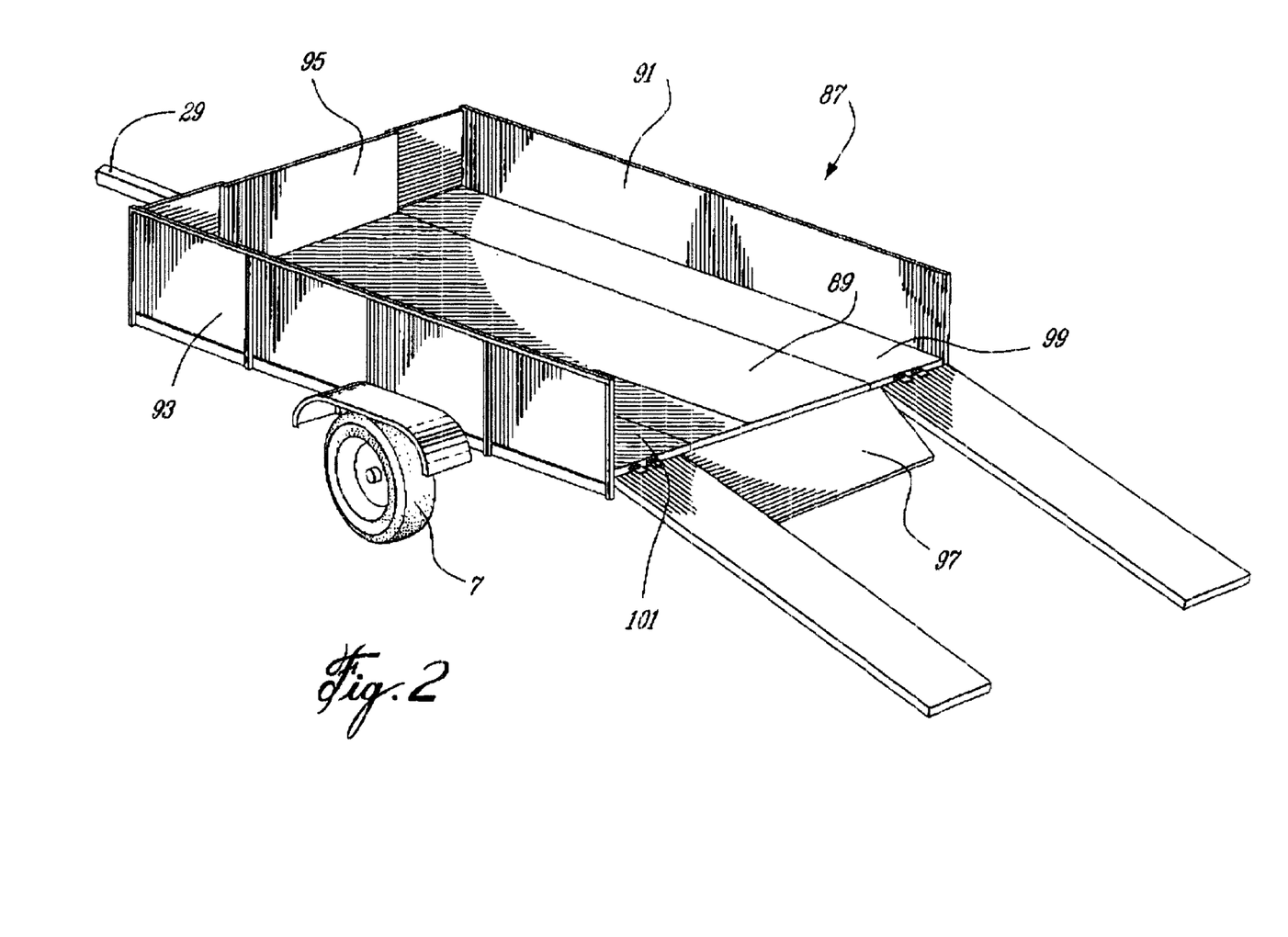
FIG. 2 is a perspective view showing the trailer in expanded position.

More specifically, rectangular framework 1 includes lateral sides 19, 21, a front side 23, a rear side 25 as well as a central link 27 that is fixedly mounted in known matter such as by welding, between front and rear sides 23, 25 as well illustrated in the drawings particularly FIG. 1. To draw the trailer, there is provided a drawbar 29 that is fixedly mounted on front side 23 of rectangular framework 1, said drawbar thereby constituting a continuity of central link 27, as illustrated. Finally, the rectangular framework comprises four supports 31, 33, 35 and 37 in the shape of a rectangular U shaped members whose specific shape and characteristics will be described in detail herein bellow.

One of the essential characteristics of the invention is the presence of two movable frames 3 and 5 which will now detailed. The two frames 3, 5 being identical, only one will be described in details, i.e. frame 3. Frame 3 generally appears as a U shaped member, including a base 39 and two legs 41 and 43 which are parallel with one another and perpendicular to base 39. To give a satisfactory stiffness to frame 3, there is provided an oblique member 45, connecting base 39 to leg 41. Frame 5 being identical to frame 3, it will be sufficient to identify its corresponding components by means of reference numerals. It will therefore be seen that frame 5 includes legs 47, 49, base 51 and a oblique reinforcement member 53.

As described above, carrying wheels 7 and 9 are fixedly mounted on the two frames 3 and 5, i.e. by means of supports 15 and 17 and freely rotatable cylinders 11 and 13. As seen in the drawings, support 15 is mounted on a plate 54, that is welded to frame 3 at the level of base 39 and oblique member 45. Similarly, support 17 is mounted on a plate 56 that is welded to frame 5 on base 51 and oblique member 53. It will be noted here that the trailer includes a loading box 87 primarily made of a horizontal platform 89, fixed in known manner to framework 1, and vertical lateral panels 91, 93, preferably fixedly mounted on bases 39 and 51 respectively of frames 3 and 5. To complete loading box 87, there are provided vertical front and rear panels 95 and 97 that are fixedly mounted in known manner to front and rear sides 23 and 25 of the framework. The pieces used to complete the loading box when the trailer is in expanded position will be discussed later.

Obviously, in order that the two frames 3, 5 be operative, frames 3,5 must be held to framework 1 and underneath framework 1. To achieve this, it should be understood that the two frames are connected together by means of an arrangement which will be discussed later and which is arranged so that the two frames constitute one single assembly. To hold this assembly, there is provided a group of four U shaped support units 31, 33, 35 and 37, as mentioned above which are all identical to one another and are fixedly mounted in a rigid manner to framework 1. More specifically, each U shaped support unit comprises two downwardly directed vertical tongues 55, 57 which are fixed such as by welding or in any other manner to framework 1, on the lateral sides 19, 21 of the latter, as illustrated in the drawings. The base of each U-shaped unit, on the other hand, consists of a metallic rod 59 that is parallel to the corresponding lateral sides 19, 21, and that connects vertical tongues 55, 57 so as to provide a rectangular space 61 whose dimension are such that a leg 41, 43, 47 or 49 can longitudinally and transversally slide therein in the direction indicated by arrows 63 and 65.

We will explain later that the two frames 3 and 5 are movable with respect to one another. An articulation mechanism that will be described herein enables to expand or retract the two frames 3 and 5 with respect to one another. Rectangular spaces 61 have been provided at the level of the U-shaped units 31, 33, 35 and 37 to provide for this relative movement of the two frames.

The articulation, enabling the two frames to expand or to retract, depending on specific needs will now be described. It will first be seen that the two frames 3, 5 are arranged to penetrate one another at the level of their Legs 41, 47 and 43, 49 and that these are adjacent by pairs i.e. pair 41, 47 and pair 43, 49. To achieve this, there is provided an articulation mechanism characterized in that at the meeting point between each pairs of legs 41, 47 and 43, 49 there is provided a pivoting rod 67 that is pivotally mounted on central link 27, in the central portion thereof at 68. It will be noted that to simplify the description, the two pivoting rods are identified by the same reference numeral, such as 67.

To still simplify the description, we will restrict the description to pivoting rod 67 which connects legs 41 and 47, it being understood that the other pivoting rod 67 which connects legs 43 and 49 is identical and mounted in the same manner between legs 43, 49.

Underneath the surface of legs 41, 47, at a point located at a short distance of the free end of each of the two legs, there are fixedly mounted, such as by welding or any other manner known to one skilled in the art, connections in the form of short bands 69, 71. Pivoting rod 67, on the other hand, is fixed at its two ends to bands 69, 71, by means of pivot joints 73, 75. The possibility of allowing pivoting rod 67 to rotate up to 180° at 68, in one direction or the other and the presence of articulations at 73, 75 enables the two frames to retract or expand between an expanded position and a retracted position as clearly illustrated in FIGS. 7 to 10. This operation will obviously produce a simultaneous longitudinal and transversal movement of legs 41, 47 and 43, 49 in rectangular space 61 according to arrows 63 and 65 as mentioned above.

The articulation about pionts 73, 75 and the pivoting movement about point 68 are made possible by means of a combination of pulleys 77, 79 and 81 and driving belts 83 and 84 that will know be described. Pulleys 77 and 79 are operatively welded in known manner on pivoting rods 67 as seen in the drawings, these two pulleys 77, 79 being connected together by means of driving belt 83. To complete the operation of pulleys 77, 79, there is provided a transmission box 85, mounted in known manner on drawbar 29 and connected also in known manner to a crank shaft 88 and pulley 81. Driving belt 84 connects pulley 81 to pulley 79.

Figure 10:
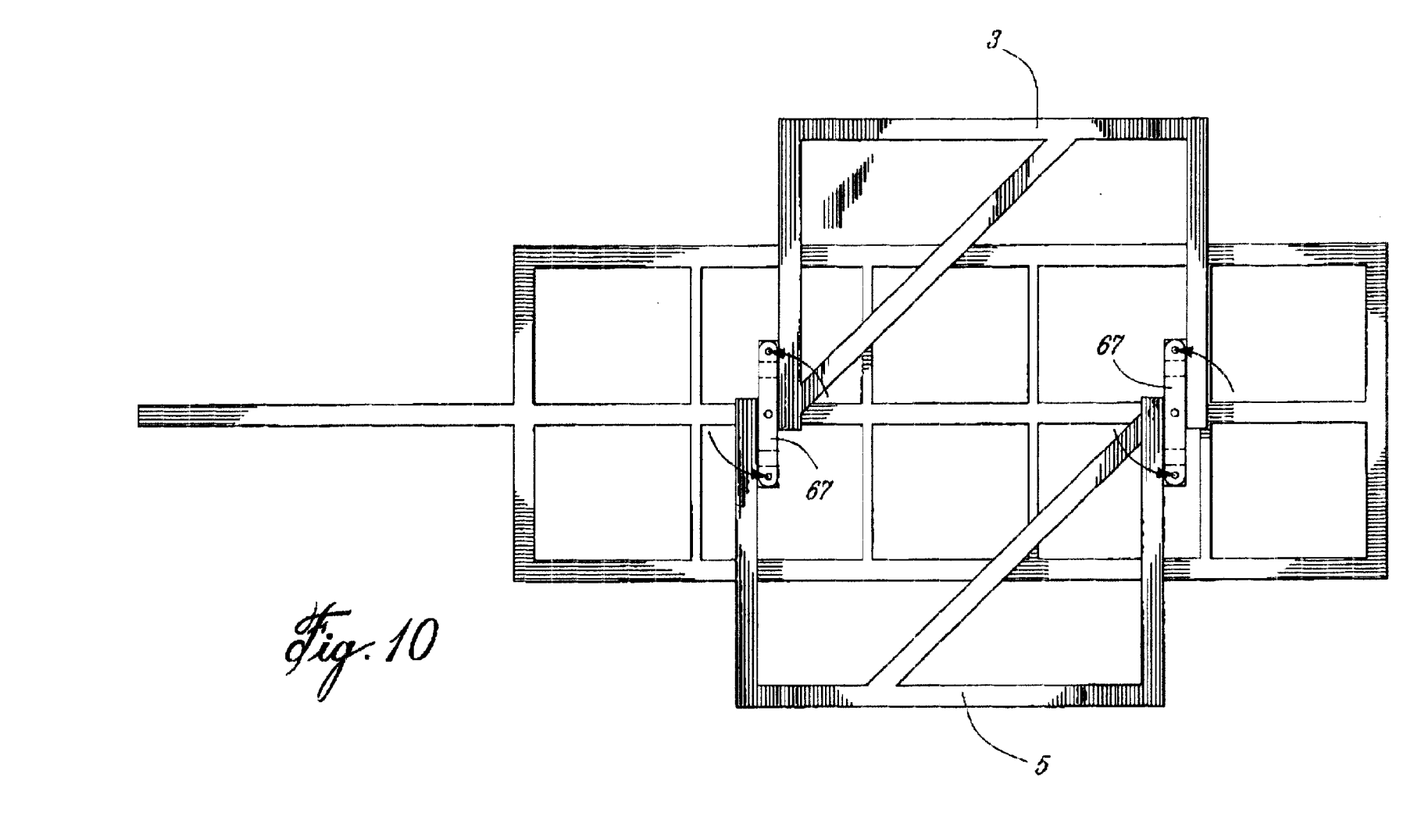
FIG. 10 is a view similar to FIG. 7, in a final expanded position.

To expand or retract movable frames 3 and 5, and consequently carrying wheels 7 and 9 and vertical lateral panel 91, 93, it is merely sufficient to use the crank 88 in one direction or the other, thereby driving the two pulleys 77, 79 and causing the two pivoting rods 67 to pivot up to 180°. To provide an expanding movement, it will be seen that the articulation of rod 67 and the longitudinal and transverse movements of legs 41, 43, 47 and 49 will cause frames 3 and 5 to adopt the expanded position. Reversely, during the operation of the crank in the opposite direction, and always according to longitudinal and transverse movements, there will be a narrowing of the two frames, until reaching the retracted position of the trailer. Reference will made particularly to FIGS. 1 and 10 for and illustration of this operation.

Figure 4:
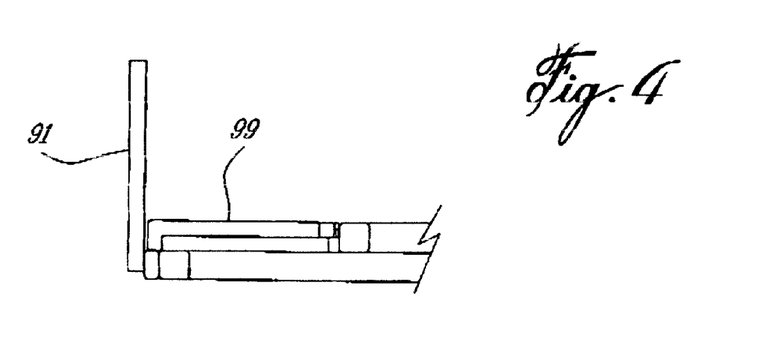
FIG. 4 is a schematic cross-section view showing the longitudinal member in a horizontal position to complete the platform when the trailer is in expanded position.
Figure 5:
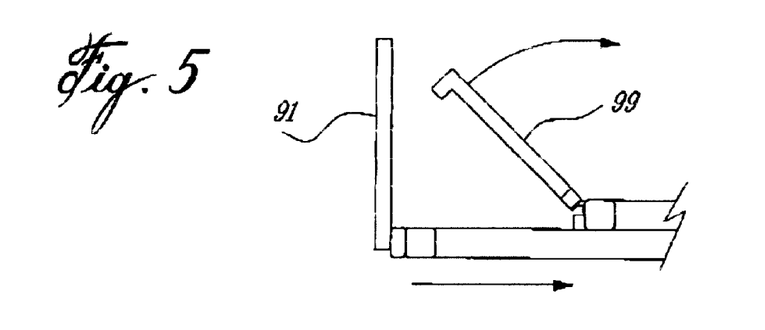
FIG. 5 is another schematic view illustrating the longitudinal member while being raised by pivoting when the trailer adopts a retracted position.
Figure 6:
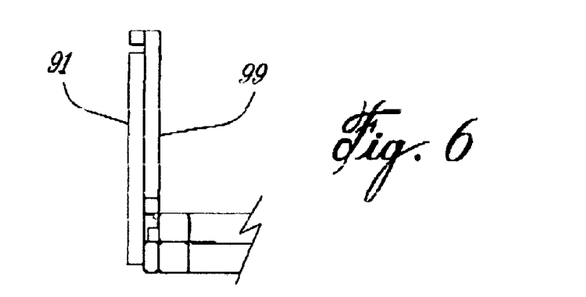
FIG. 6 is a schematic section view showing the longitudinal member in contact with the lateral wall of the loading box, when the trailer is in expanded position.
Figure 7:
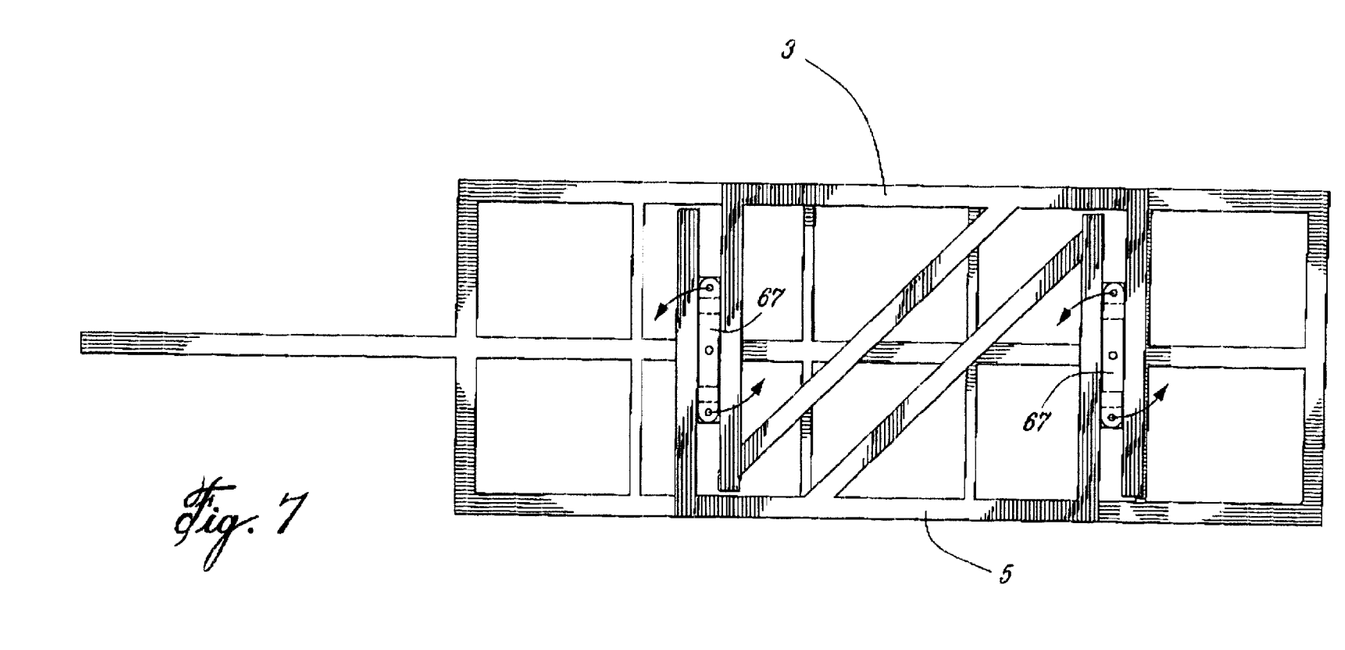
FIG. 7 is a schematic view illustrating the mechanism used to expand the trailer, in retracted position.
Figure 8:
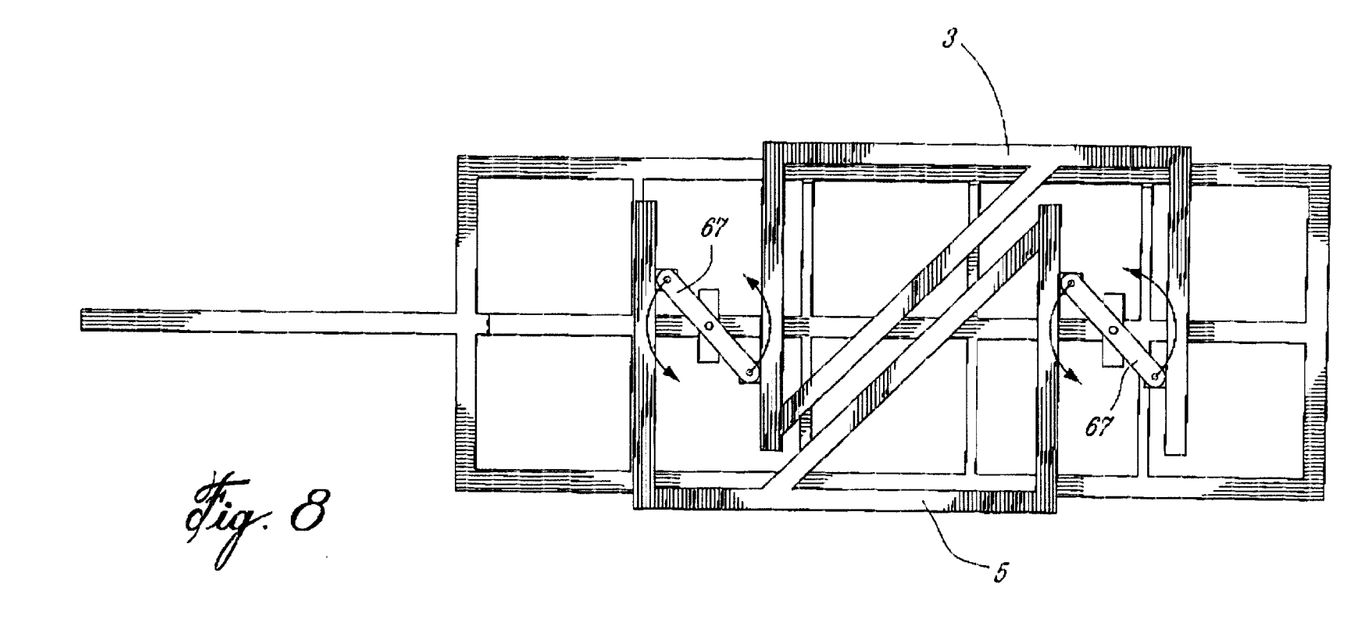
FIG. 8 is a view similar to FIG. 7, in an initial intermediate expanded position.
Figure 9:
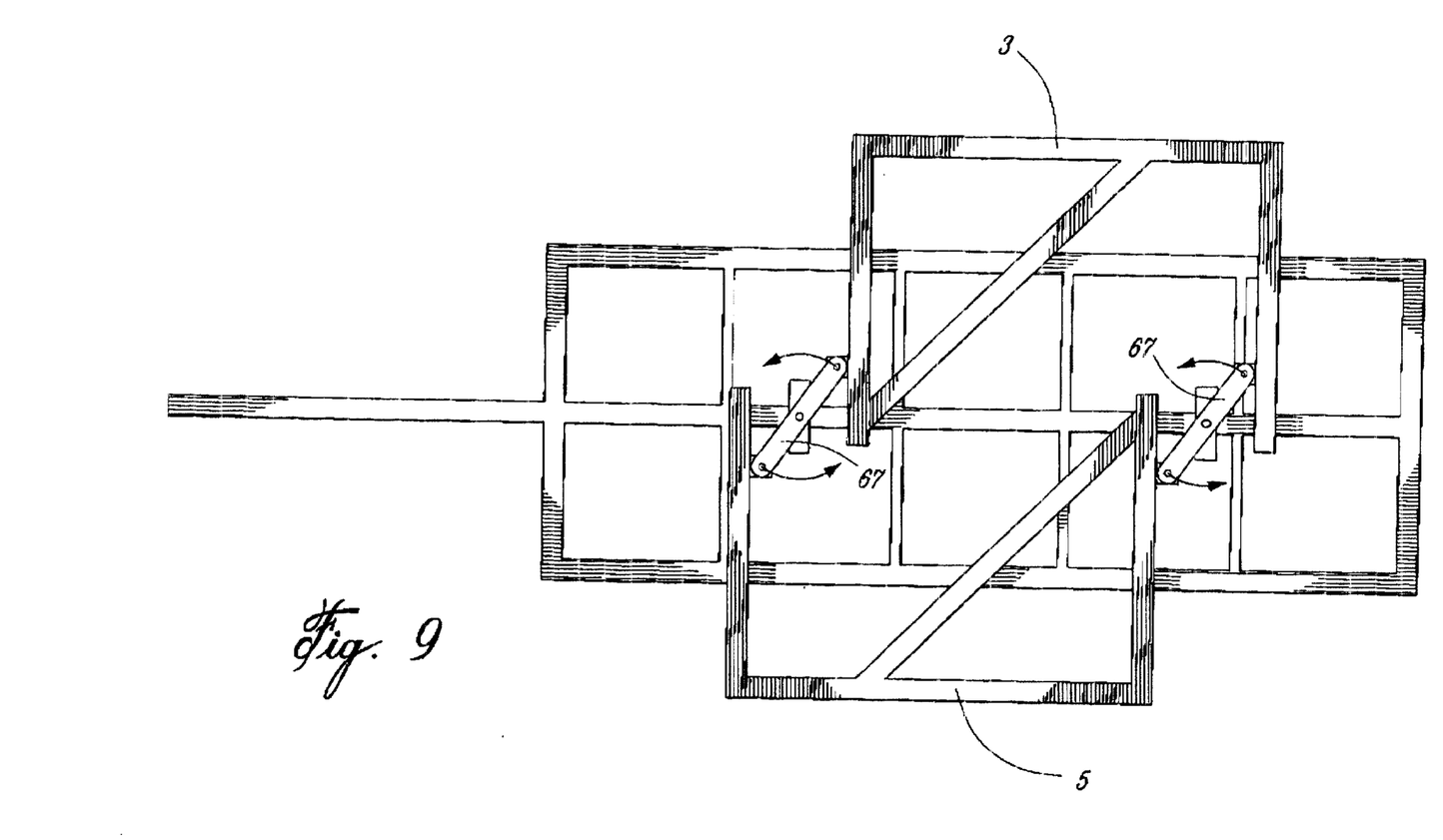
FIG. 9 is a view similar to FIG. 7, in an advanced intermediate expanded position.

When the trailer is in the expanded position, there is obviously something missing at the level of the platform. To overcome this absence, there are provided longitudinal members 99. 101 that are pivotally mounted respectively along lateral side 19 and 21 of framework 1. With reference to FIG. 4, it will be seen that in a vertical position, longitudinal member 99, 101 constitutes one side of the loading box by resting against lateral panel 91. However, in a horizontal position, as seen in FIG. 6, the longitudinal member 99, 101 now completes platform 89 of the loading box 87.

Figure 3:
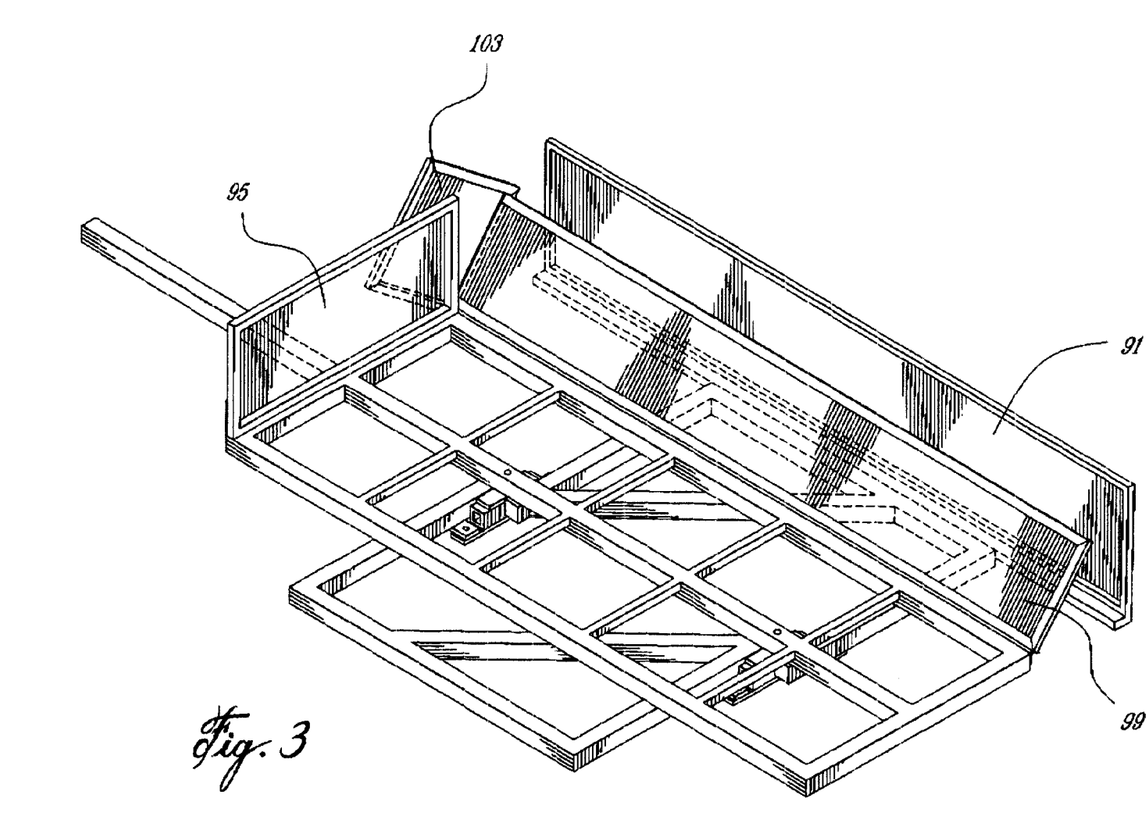
FIG. 3 is a schematic view in perspective illustrating a longitudinal pivoting member used to complete the platform when the trailer is in expanded position.

Referring now to FIGS. 3 and 4, it will be seen that each longitudinal member 99, 101 comprises a secondary panel 103 that is perpendicularly fixed to one end of the latter to constitute and extension of front panel 95 when the trailer is in the expanded position and longitudinal member 99, 101 is horizontally mounted along platform 89. On the other hand, in the retractedelesed position of the triler, secondary panel 103 is folded exteriorly and against front panel 95. A second secondary panel will be provided, in the case where the loading box also comprises a rear panel 97.

It is understood that according to the invention modifications to the preferred embodiment that has be described are possible, of course, provided that these modifications are within the scope of the appended claims.

What is claimed is:

1. A retractable and expandable trailer comprising a rectangular framework, a loading box fixedly mounted on said framework and including a horizontal platform, and a group of freely rotatable carrying wheels which allow said trailer to be pulled, characterized in that there are provided two frames disposed underneath the framework and arranged to engage one frame into the other one between an expanded position of said trailer where said frames are drawn apart from one another and a retracted position of said trailer where said frames are drawn in towards one another, supports fixedly mounted on said framework, said framework holding said frames with said supports, said supports being arranged to permit a simultaneous transverse and longitudinal movement of said frames with respect to said framework when said frames are moved between said expanded position and said retracted position, said carrying wheels being respectively fixed to the two frames, and an articulation device which allows said frames to move by transverse and longitudinal sliding in said supports between said expanded position and said retracted position and vice versa, and longitudinal members adapted to be juxtaposed relative to said horizontal platform on both sides of said platform in said expanded position of said trailer.

2. A trailer according to claim 1, characterized in that said frames each include a base and two legs perpendicular to said base, said legs being each introduced in said supports in which they can be subjected to said transverse and longitudinal movement, vertical lateral panels each rising from a base of a corresponding frame and fixed to said base in order to define the two sides of the loading box.

3. A trailer according to claim 2 characterized in that the trailer comprises a front panel rising from the front end of said rectangular framework, to join said vertical lateral panels and thereby constitute said loading box.

4. A trailer according to claim 3 characterized in that said rectangular framework includes lateral sides, a rear side and a front side as well as a central link, fixed between the rear and front sides, said longitudinal members are each mounted in order to pivot along said lateral sides of said rectangular framework to adopt either a vertical position in said retracted position of said trailer where said longitudinal members and said panels are placed against one another, or a horizontal position in said expanded position of said trailer, said longitudinal members then constituting an extension of said platform.

5. A trailer according to claim 4, characterized in that each longitudinal member comprises a secondary panel perpendicularly fixed at one end of said longitudinal member to constitute an extension of the front panel in said expanded position of said trailer, when said longitudinal member is in a horizontal position, and when said longitudinal member is in a vertical position in said refracted position of said trailer, said secondary panel is placed outside said front panel and against said front panel, while each said lateral panel rests on a corresponding longitudinal member, said longitudinal member then being in a vertical position.

6. A trailer according to claim 2, characterized in that the articulation device comprises a pivoting rod, that is articulated at one end along a leg of a frame and at the other end, along a corresponding leg of the other frame, said pivoting rod being pivotafly mounted on said framework, and means enabling to cause a 180° rotation of said rod and to cause a retraction or expansion of said frames between said retracted and expanded positions, by articulation of said pivoting rod with respect to the two legs on which the frame is articulated.

7. A trailer according to claim 6, characterized in that the articulation device comprises two pivoting rods, so that each leg of one frame is connected to a corresponding leg of the other frame.

8. A trailer according to claim 7, characterized in that said trailer comprises a pivot pulley fixedly mounted to each pivoting rod, at a location where said pivoting rods pivots on said framework, driving means provided for rotation of the two pulleys and thus causing a 180° rotation of each articulated rod, and consequently, extension or retraction of the two frames.

9. A trailer according to claim 8, characterized in that each pivoting rod is pivotally mounted on a central link of said framework.

10. A trailer according to claim 8, characterized in that said trailer comprises a drawbar that is fixedly mounted on said framework, a transmission box mounted on said drawbar, said transmission box being operatively connected to each articulated rod by means of said pivot pulleys.

11. A trailer according to claim 10, characterized in that said transmission box includes a diving pulley as well as a crank in order to rotate the driving pulley.

12. A trailer according to claim 11, characterized in that said pivot pulleys and said trailing pulley comprise sheave wheels.

13. A trailer according to claim 12, characterized in that said driving pulley and said pivot pulley are functionally connected to one another by means of a system of straps.

14. A trailer according to claim 1, characterized in that said trailer comprises one said support for each leg of the two frames, said supports being shaped to define a rectangular opening capable of receiving one said leg and enabling a transverse and longitudinal sliding of said legs in said supports.

* * * * *